United States Patent
McLeod et al.

(10) Patent No.: US 9,551,138 B2
(45) Date of Patent: Jan. 24, 2017

(54) CONNECTOR FOR BATHTUB TAILPIPE TO DRAIN PIPE

(71) Applicant: Oakville Stamping & Bending Ltd., Oakville, Ontario (CA)

(72) Inventors: Christopher Adam McLeod, Toronto (CA); Robert Evans, London (CA)

(73) Assignee: Oakville Stamping & Bending Ltd. (CA)

( * ) Notice: Subject to any disclaimer, the term of this patent is extended or adjusted under 35 U.S.C. 154(b) by 757 days.

(21) Appl. No.: 13/833,791

(22) Filed: Mar. 15, 2013

(65) Prior Publication Data

US 2014/0259384 A1   Sep. 18, 2014

(51) Int. Cl.
*E03C 1/22* (2006.01)
*E03F 5/04* (2006.01)

(52) U.S. Cl.
CPC .............. *E03C 1/22* (2013.01); *E03F 5/0407* (2013.01)

(58) Field of Classification Search
CPC .............. E03C 1/22; E03C 1/232; E03C 1/24; E03F 5/0407
USPC ............................................. 4/686, 287, 288
See application file for complete search history.

(56) References Cited

U.S. PATENT DOCUMENTS

| | | | | |
|---|---|---|---|---|
| 433,465 | A * | 8/1890 | Blessing | B23D 63/10 33/202 |
| 438,465 | A * | 10/1890 | Blessing | E03C 1/244 4/287 |
| 2,544,498 | A * | 3/1951 | Hiertz | E03C 1/262 4/287 |
| 2,761,626 | A * | 9/1956 | Gustaveson | E03C 1/2665 4/679 |
| 6,295,665 | B1 * | 10/2001 | Domenig | E03C 1/244 4/686 |
| 6,381,775 | B1 * | 5/2002 | Sondrup | E03C 1/22 4/286 |
| 6,694,684 | B2 * | 2/2004 | Radke | E04G 15/061 285/4 |
| 8,112,827 | B2 * | 2/2012 | DeGooyer | E03C 1/20 4/288 |
| 8,191,330 | B1 * | 6/2012 | Cornwall | E03F 5/0407 52/220.8 |
| 2011/0101685 | A1 | 5/2011 | Lai | |

* cited by examiner

*Primary Examiner* — Tuan N Nguyen
(74) *Attorney, Agent, or Firm* — Harness, Dickey & Pierce, P.L.C.

(57) ABSTRACT

A connector is provided for connecting a bathtub tailpipe to a drain pipe. The connector has an inlet end to receive the tailpipe and an outlet end that is mountable to the drain pipe, and has a passage extending therebetween. A seal extends about the passage for slidably engaging the tailpipe in a fluid sealing manner.

12 Claims, 5 Drawing Sheets

CONNECTOR FOR BATHTUB TAILPIPE TO DRAIN PIPE

FIELD OF INVENTION

This invention relates generally to bathtub drain pipe connectors and more particularly to connectors for sealingly connecting tailpipes of free standing bathtubs to drain pipes.

BACKGROUND OF THE INVENTION

The drainage system for an island bathtub is supplied beneath the bath in the floor. Generally, no lateral access is provided necessitating connection of the bathtub to the drain pipe either from above or below the floor. In an existing building, connection from above the floor requires destruction of the existing floor. Destruction creates new challenges including refinishing the floor around a bathtub and providing proper support for the bathtub.

In the construction process for a new building, access from below the floor requires the bathtub be installed prior to finishing the ceiling of the room beneath the bath. This early installation of the bath subjects the bathtub to damage for the duration of the construction process.

SUMMARY OF THE INVENTION

The present invention provides a connector for sealingly connecting a bathtub tailpipe to a drain pipe. The connector comprises a seal and a body wherein the body has an inlet end opposite an outlet end with a passage extending therebetween. The outlet end is mountable to one end of the drain pipe, and the inlet end receives the tailpipe. The seal extends about the passage for slidably engaging the tailpipe in a fluid sealing manner.

The connector may further comprise a first part extendably retained to a second part wherein the first part and second part are relatively axially moveable. The first part defines the inlet end and receives the tailpipe, and the second part defines the outlet end, and is mountable to one end of the drain pipe.

The seal extending about the passage may have a generally annular body and comprise a first end opposite a flanged end. The first end and the annular body are insertable into one of the two parts of the connector, and the flanged end interfaces with both the first part and the second part.

The first part of the connector may have an interior flange for receiving the first end of the seal. The first part of the connector may have an end opposite the interior flange that engages the flanged end of the seal. The first part of the connector and the second part of the connector may threadedly engage. The second part of the connector may have an inner flange that registers with the flanged end of the seal. The flanged end on the seal may be compressed between the end of the first part and the inner flange of the second part in response to the first part and the second part being urged towards each other through the threaded engagement.

The connector may further comprise a spacer having an external flange for engaging a floor and an internal flange for engaging the first part of the connector to limit lateral movement of the connector.

The external flange may be integral with the first part of the connector.

The connector may further comprise an adapter extending between the outlet end of the passage and the drain pipe to adapt the connector to fit over the drain pipe.

A seal is also provided for sealing against a bathtub tailpipe wherein the seal forms part of a connector having a first part and a second part for connecting the bathtub tailpipe to a drain pipe. The seal comprises an annular body having a first end opposite a flanged end with a passage extending therebetween. The interior of the annular body has at least one radially inwardly projecting rib for sealingly engaging the tailpipe. The first end and the annular body are insertable into one of the two parts of the connector. The flanged end of the seal interfaces with the first part and the second part of the connector.

BRIEF DESCRIPTION OF THE DRAWINGS

Preferred embodiments of the present invention are described below with reference to the accompanying illustrations in which.

DETAILED DESCRIPTION

Figure 1:
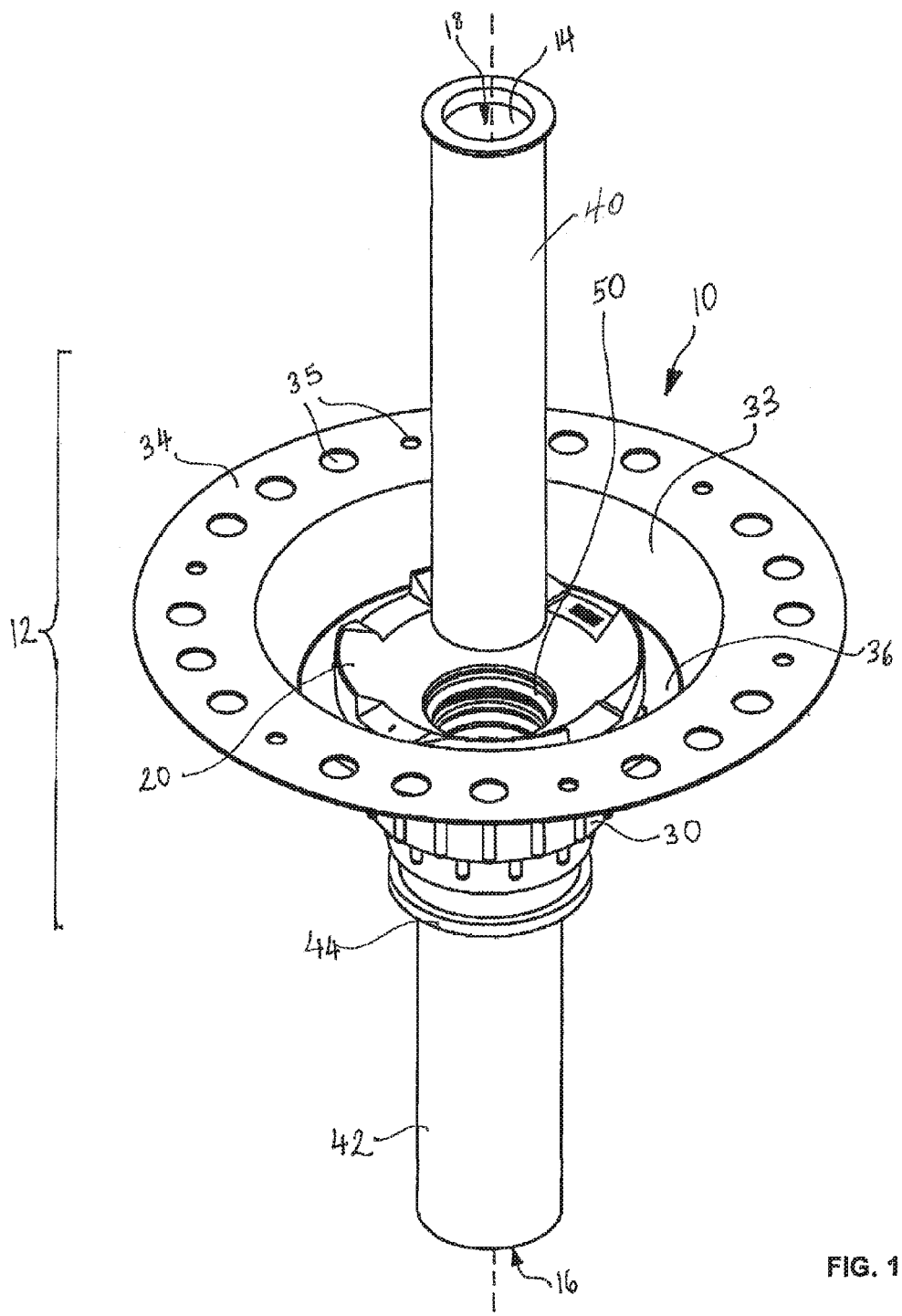
FIG. 1 is a perspective view of a connector for connecting a bathtub tailpipe to a drain pipe.

A connector 10 sealingly connects a bathtub tailpipe 40 to a drain pipe 42 as indicated in the accompanying illustrations. The connector 10 has a body 12 having an inlet end 14 opposite an outlet end 16 with a passage 18 extending therebetween. The inlet end 14 receives the bathtub tailpipe 40, the outlet end 16 is mountable to the drain pipe 42. In this way, the connector 10 connects the bathtub tailpipe 40 to the drain pipe 42. The passage 18 permits fluid such as bathwater to flow from the bathtub tailpipe 40 to the drain pipe 42. To sealingly connect the bathtub tailpipe 40 to the drain pipe 42, a seal 50 extends about the passage 18 that slidably engages the tailpipe 40 in a fluid sealing manner. The seal 50 inhibits the fluid such as bathwater from flowing out of the passage 18 and into the periphery.

The connector 10 further comprises a first part 20 defining the inlet end 14, and a second part 30 defining the outlet end 16. The first part 20 and the second part 30 are extendably retained to each other and are relatively axially moveable. In one embodiment, the first part 20 and the second part 30 may threadedly engage. The seal 50 extending about the passage 18 has a generally annular body 52 having a first end 54 and a flanged end 56. The first end 54 and the annular body 52 are insertable into one of the two parts of the connector 10. A portion of the flanged end 56 extends between the first part 20 and second part 30. The first part 20 and the second part 30 are urged toward each other, and the flanged end 56 interfaces with both the first part 20 and the second part 30. This causes compression of the seal 50 between the first part 20 and the second part 30 to effect the sealing therebetween.

In one embodiment, the first end 54 and the annular body 52 of the seal are insertable into the first part 20 of the connector. The first part 20 has an interior flange 22 for receiving the first end 54 of the seal. The first part has an end 24 opposite the interior flange 22 that engages the flanged end 56 of the seal preventing it from inserting into the first part 20. The second part 30 has an inner flange 32 that registers with the flanged end 56. Because the first part 20 and the second part 30 are urged toward each other when threadedly engaged, the flanged end 56 is compressed between the first part 20 and the second part 30, that is, between the end 24 and the inner flange 32. This compression of the seal 50 between the first part 20 and the second part 30 effects the sealing feature of the connector 10.

In an alternative embodiment, the first end 54 and the annular body 52 may be insertable into the second part 30 rather than the first part 20. The flanged end 56 would still be compressed between the first part 20 and the second part 30 effecting the sealing function.

Figure 2:
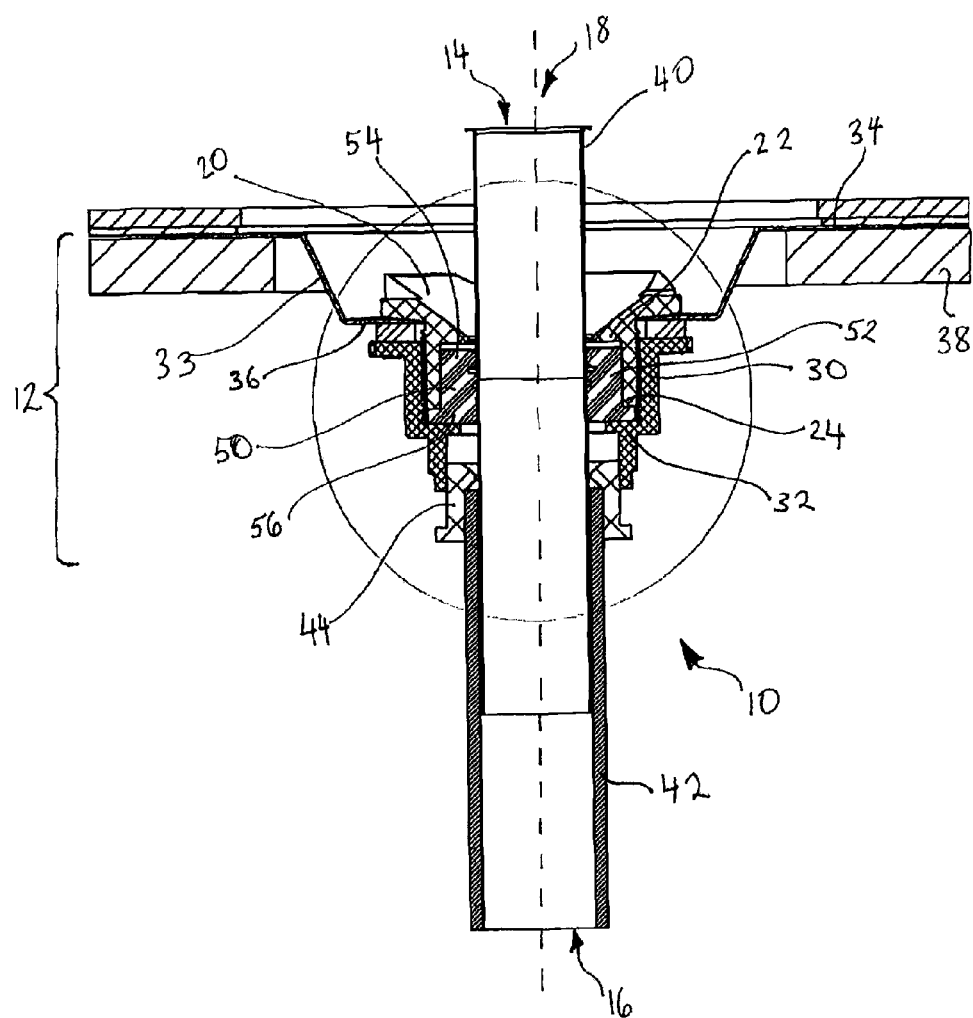
FIG. 2 is a cross-section view of the connector in FIG. 1.
Figure 3:
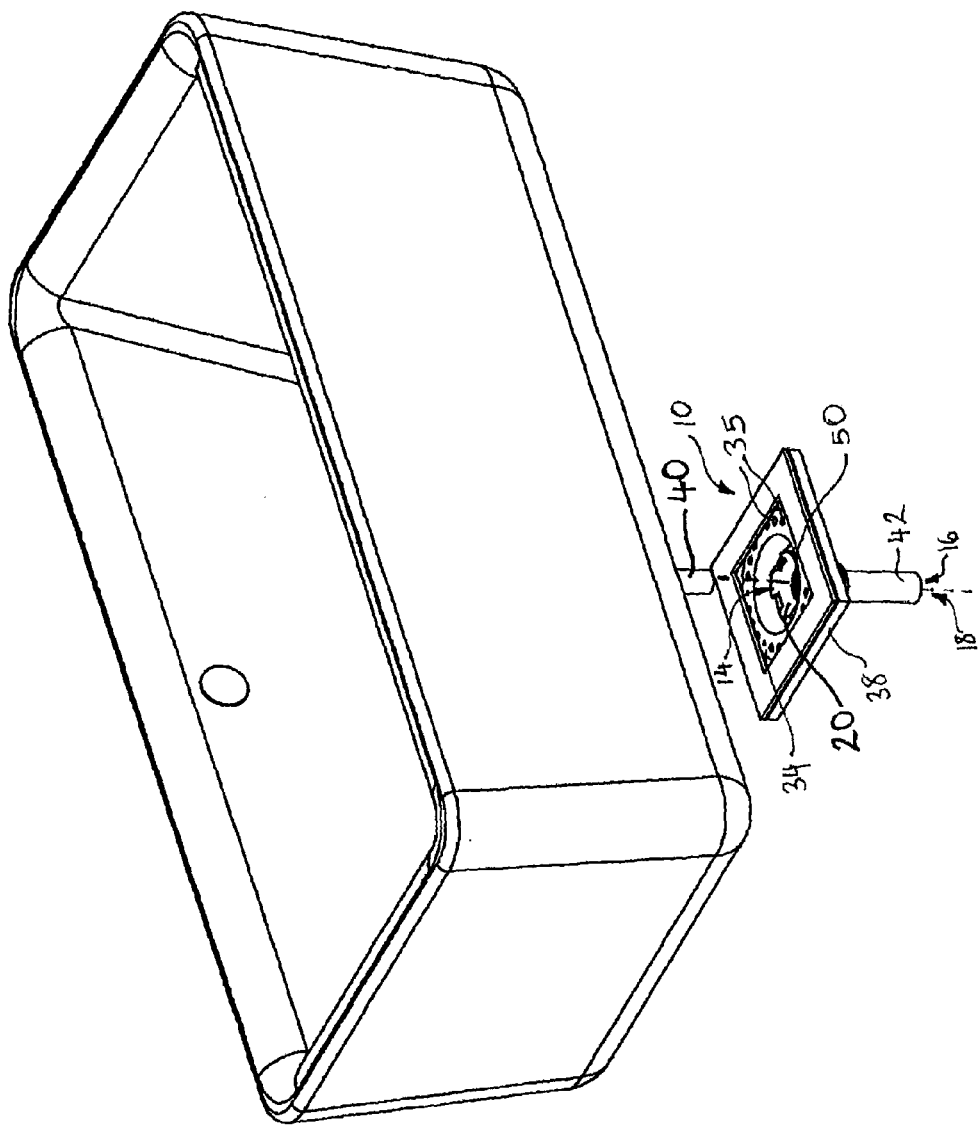
FIG. 3 is a perspective view of the connector preparing to receive a bathtub tailpipe.
Figure 4:
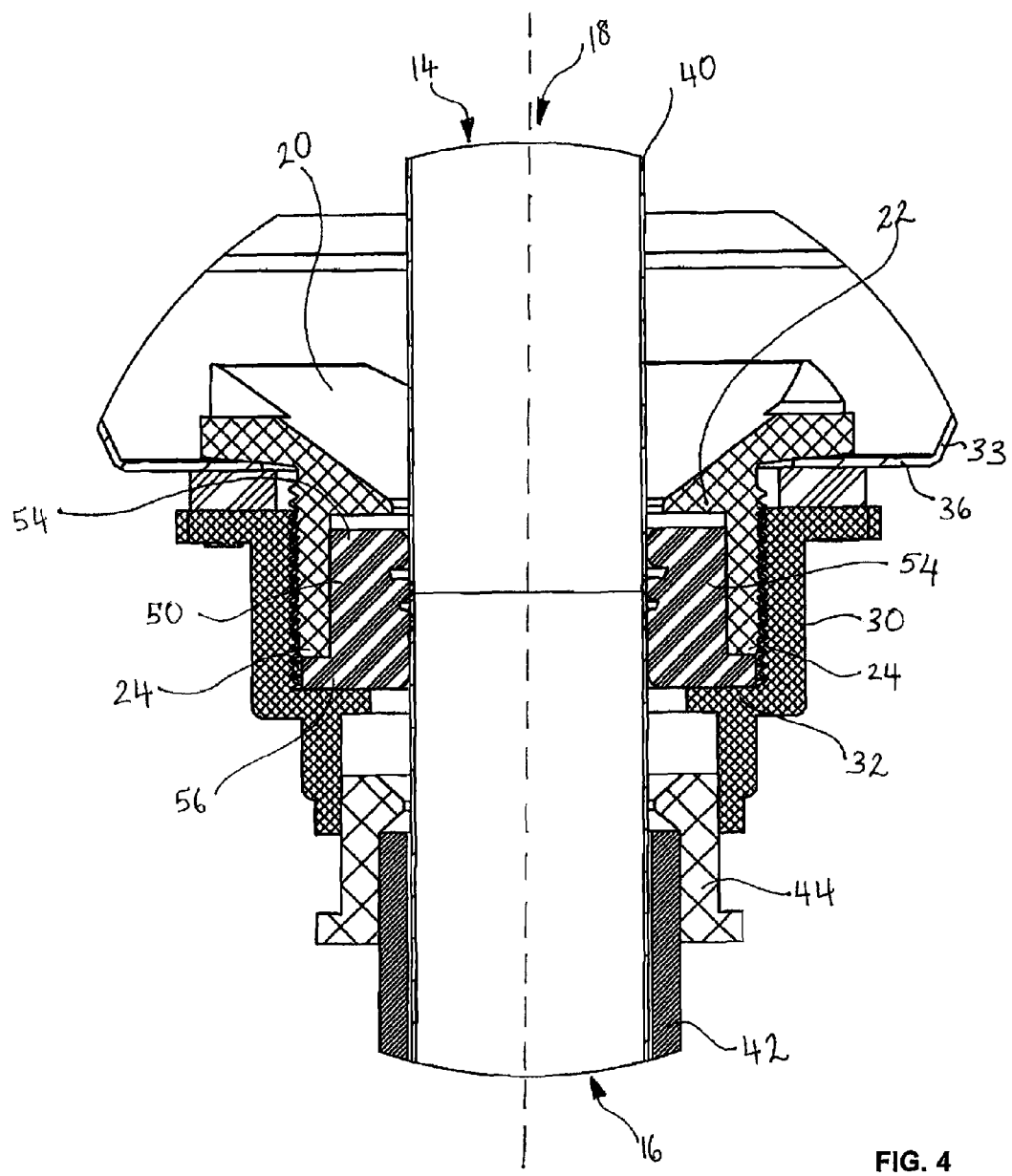
FIG. 4 is an enlarged view of the encircled area in FIG. 2.
Figure 5:
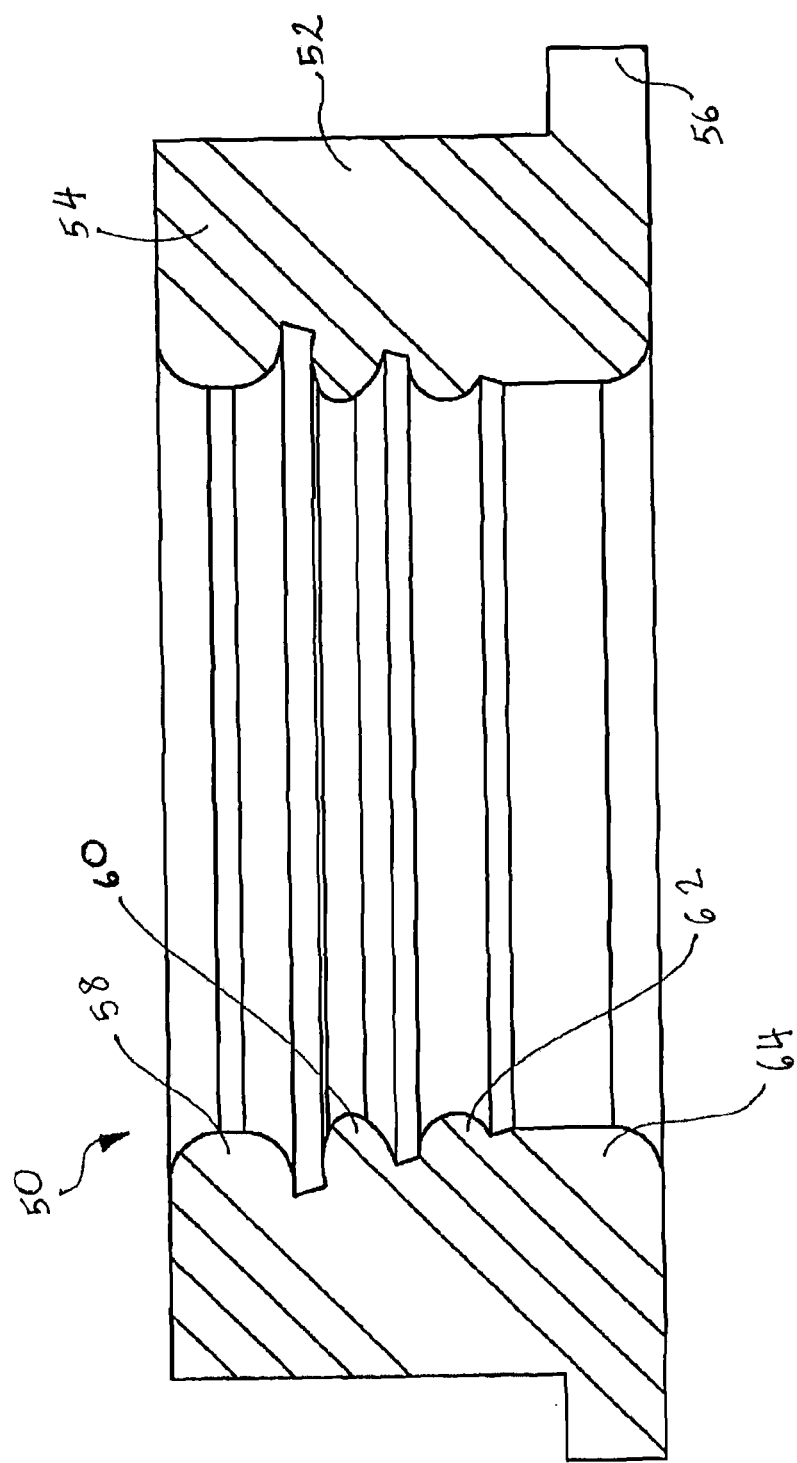
FIG. 5 is a cross-section view of a seal.

The connector 10 further comprises a spacer 33 having an external flange 34 for engaging a floor 38 and an internal flange 36 for engaging the first part of the connector 20 to limit lateral movement of the connector 10. In one embodiment, this external flange 34 and internal flange 36 may form part of an annular plate as shown in FIG. 2. This annular plate may be externally round, square, or any other suitable shape. The external flange 34 of the spacer 33 engages the floor 38 to limit lateral movement, whereas the internal flange 36 is held in place between the first part 20 and the second part 30. By being held in place and having the external flange 34 engage the floor, the internal flange 36 limits the lateral movement of the connector 10. The external flange 34 may be fixed to the floor which may be wood. FIGS. 1 and 2 shows the external flange 34 with apertures 35 for receiving fasteners such as screws. In other embodiments, the external flange 34 may be secured using glue or other adhesive agents. Alternatively, the external flange 34 could be secured by fitting into pre-cut recesses in the floor. Fixing the external flange 34 to the floor 38 provides a secured connector 10 to which the remaining plumbing can be attached. The depth of the spacer 33 is determined by the height of the first part 20. The spacer 33 must be deep enough to ensure the first part 20 does not protrude above the floor 38 in order to provide clearance for the bathtub drain fitting underlying and fixed to the bath that is placed upon the floor 38.

The external flange 34 may alternatively be integral with the first part 20 obviating the need for an internal flange. In this embodiment, the external flange 34 would be located on the first part 20 such that sufficient clearance is provided for the bathtub when placed on the floor 38.

The connector 10 may further comprise an adapter 44 extending between the outlet end 16 of the passage 18 and the drain pipe 42 to adapt the connector 10 to fit over the drain pipe 42. In one embodiment, this adapter 44 may increase the external diameter of the drain pipe 42 so that the drain pipe 42 and the connector 10 fit more closely together. Alternatively, this adapter 44 may decrease the internal diameter of the outlet end 16 to enable a more snug fit between the connector 10 and the drain pipe 42. In other embodiments, the adapter 44 may otherwise increase or decrease the external or internal diameters of the drain pipe 42 or outlet end 18 to enable a close fit. Adhesive agents may be placed between the various elements to secure them in place.

Alternatively, an adapter 44 may be unnecessary and the drain pipe 42 could fit directly within the second part 30. In these cases, the drain pipe 42 may register directly with part of the seal 50 or may instead register with the inner flange 32 of the second part 30. In still other embodiments, the drain pipe 42 may have a larger diameter than the outlet end 16 of the connector 10. In these cases, the outer circumference of the second part 30 may be modified to accommodate the attachment of a larger diameter drain pipe 42.

As mentioned above, the seal 50 has an annular body 52 having a first end 54 opposite a flanged end 56. The interior of the annular body 52 has at least one radially inwardly projecting rib 58 for sealingly engaging the tailpipe. Additional ribs such as the second rib 60, third rib 62, and fourth rib 64 may also be provided.

The scope of the claims should not be limited by the embodiments set forth in the examples, but should be given the broadest interpretation consistent with the description as a whole.

PARTS LIST 10 connector
12 body
14 inlet end
16 outlet end
18 passage
20 first part
22 interior flange
24 end
30 second part
32 inner flange
33 spacer
34 external flange
35 apertures
36 internal flange
38 floor
40 bathtub tailpipe
42 drain pipe
44 adapter
50 seal
52 annular body
54 first end
56 flanged end
58 radially projecting inward rib
60 second rib
62 third rib
64 fourth rib

What is claimed is:

1. A connector for connecting a bathtub to a drain pipe comprising:
    a tailpipe having an upper end configured for connecting to a bottom portion of the bathtub, the tailpipe being a tube with an inner surface having an inner diameter and an outer surface having an outer diameter;
    a body having an inlet end opposite an outlet end with a passage extending therebetween
    the outlet end being configured to be mounted to one end of the drain pipe;
    the inlet end having an opening with a diameter larger than the outer diameter of the tailpipe and being configured to slidably receive a lower end of the tailpipe;
    a seal, extending about the passage for slidably engaging the outer surface of the tailpipe in a fluid sealing manner; and wherein:
    the body is configured to be mounted to a floor with the outlet end of the body being mounted to the drain pipe; and
    the upper end of the tailpipe is configured to be connected to a bottom portion of the bathtub and the lower end of the tailpipe is configured to be placed into the inlet end and through at least a portion of the body, with the seal serving to seal fluid flow from the tailpipe to the drain pipe.

2. The connector as claimed in claim 1 wherein the body comprises:
    a first part coupled to a second part wherein:
        the first part defines the inlet end;

the second part defines the outlet end;

the first part and the second part are relatively axially moveable.

3. The connector as claimed in claim 2 wherein said seal has a generally annular body extending about the passage and comprises a first end opposite a flanged end wherein:

the first end and the annular body are insertable into one of the two parts of the connector;

the flanged end interfaces with both the first part and the second part.

4. The connector as claimed in claim 3 wherein the first end and the annular body of said seal are insertable into the first part of the connector.

5. The connector as claimed in claim 4 wherein:

the first part has an interior flange for receiving the first end of the seal;

the first part has an end opposite the interior flange that engages the flanged end of the seal;

the first part threadedly engages the second part;

the second part has an inner flange that registers with the flanged end of the seal;

the flanged end of the seal is compressed between the end of the first part and the inner flange of the second part in response to the first part and the second part being urged toward each other through the threaded engagement.

6. The connector as claimed in claim 2 further comprising a spacer having an external flange for engaging a floor and an internal flange for engaging the first part of the connector to limit lateral movement of the connector.

7. The connector as claimed in claim 6 wherein said external flange is integral with said first part.

8. The connector as claimed in claim 2 further comprising an adapter extending between the outlet end of the passage and the drain pipe to adapt the connector to fit over the drain pipe.

9. Apparatus for connecting a bathtub to a drain pipe in a floor, said device comprising:

a tailpipe having an upper end configured for connection to a bottom portion of the bathtub, the tailpipe being a tube with an inner surface having an inner diameter and an outer surface having an outer diameter;

a connector body having an inlet end and an opposite outlet end with a passage therethrough;

a flange having a peripheral surface adapted to be mounted to the floor;

the inlet end having an opening with a diameter larger than the outer surface of the tailpipe and being configured to slidably receive a lower end of the tailpipe;

the outlet end being configured to be mounted to one end of the drain pipe; and an annular seal in the connector body surrounding the passage adapted to slidingly engage the outer surface of the tailpipe and wherein:

the body is mounted to a floor with the flange, with the outlet end of the body being mounted to the drain pipe; and the upper end of the tailpipe is configured to be connected to a bottom portion of the bathtub and the lower end of the tailpipe is configured to be placed into the inlet end and through at least a portion of the body, with the seal serving to seal fluid flow from the tailpipe to the drain pipe.

10. The apparatus of claim 9 which further comprises:

a tapered surface extending downwardly and radially inwardly towards the passage for guiding the tailpipe into the passage.

11. The apparatus of claim 9 wherein the connector body has a first part and a second part, and wherein the seal comprises:

an annular seal body having a first end opposite a flanged end with a passage extending therebetween wherein:

interior portions of the annular body having at least one radially inwardly projecting rib for sealingly engaging the tailpipe;

a first end of the annular seal body being inserted into the first or second part of the connector body; and the flanged end of the seal body interfaces with both the first part and second part of the connector body.

12. A connector for connecting a bathtub to a drain pipe comprising:

tailpipe with a circumferentially outer face extending along a length thereof, the tailpipe having an upper end configured for connection to a bottom portion of the bathtub, the tailpipe being a tube with an inner surface having an inner diameter and an outer surface having an outer diameter;

a body having an inlet end opposite an outlet end with a passage extending therebetween wherein:

the outlet end is mountable to one end of the drain pipe;

the inlet end having an opening with a diameter larger than the outer diameter of the tailpipe and being configured to slidably receive a lower end of the tailpipe;

a seal extends about the passage for axially slidably engaging the circumferentially outer face of the tailpipe in a fluid sealing manner and wherein:

the body is configured to be mounted to a floor with the outlet end of the body being mounted to the drain pipe; and the upper end of the tailpipe is configured to be connected to a bottom portion of the bathtub and the lower end of the tailpipe is configured to be placed into the inlet end and through at least a portion of the body, with the seal serving to seal fluid flow from the tailpipe to the drain pipe.

* * * * *